(12) United States Patent
Davis et al.

(10) Patent No.: US 10,343,787 B2
(45) Date of Patent: Jul. 9, 2019

(54) ROTOR SYSTEMS AND METHODS

(71) Applicant: Bell Helicopter Textron Inc., Fort Worth, TX (US)

(72) Inventors: Alison Ann Davis, North Richland Hills, TX (US); Charles Speller, Flower Mound, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 15/788,039

(22) Filed: Oct. 19, 2017

(65) Prior Publication Data
US 2019/0118961 A1  Apr. 25, 2019

(51) Int. Cl.
  *B64D 35/00* (2006.01)
  *B64C 27/12* (2006.01)
  *B64C 27/82* (2006.01)

(52) U.S. Cl.
  CPC ............. *B64D 35/00* (2013.01); *B64C 27/12* (2013.01); *B64C 27/82* (2013.01); *B64C 2027/8254* (2013.01)

(58) Field of Classification Search
  CPC ......... B64D 35/00; B64C 27/12; B64C 27/82; B64C 2027/8254
  See application file for complete search history.

(56) References Cited

U.S. PATENT DOCUMENTS

| | | | |
|---|---|---|---|
| 9,145,772 B2 * | 9/2015 | Baxley | F01D 5/082 |
| 9,174,728 B2 | 11/2015 | Altmikus et al. | |
| 10,035,590 B2 * | 7/2018 | Probst | B29C 70/30 |
| 2016/0363206 A1 | 12/2016 | Modrzejewski et al. | |
| 2018/0022448 A1 * | 1/2018 | Orbon | B64C 27/00 416/105 |

* cited by examiner

*Primary Examiner* — Hieu T Vo
(74) *Attorney, Agent, or Firm* — Timmer Law Group, PLLC

(57) ABSTRACT

A rotor system including a hub; a rim configured to rotate about the hub, the rim including an interior surface and an engagement surface; a plurality of rotor blades extending from the hub and coupled to the interior surface of the rim; and one or more outer drive gears disposed adjacent to the engagement surface of the rim; each of the one or more outer drive gears including a plurality of teeth for engaging the engagement surface of the rim; wherein the one or more outer drive gears are configured to rotate the rim such that the plurality of rotor blades rotates about the hub. Other aspects provide an aircraft rotor system and methods of operating an aircraft rotor system.

20 Claims, 9 Drawing Sheets

ROTOR SYSTEMS AND METHODS

BACKGROUND

Technical Field

The present disclosure relates to rotor systems and methods relating thereto and, more particularly, to aircraft rotor systems and methods for rotating such systems.

Description of Related Art

Conventional rotor assemblies have rotor hubs that are coupled to and powered by conventional drive systems, including large gearboxes and large drive shafts coupled to the rotor hub, which requires large rotor hubs to accommodate the drive systems. A large rotor hub decreases the usable flow area of a rotor assembly and, therefore, decreases rotor assembly efficiency and increases weight. Furthermore, one drive system coupled to and powering a rotor assembly results in a single point of failure for the rotor assembly, which can increase the likelihood of rotor assembly failure and decrease safety.

There is a need for a rotor system and method that increases the usable flow area of a rotor assembly, increases efficiency of the rotor assembly, decreases weight of the rotor assembly, and decreases the likelihood of rotor assembly failure.

SUMMARY

In a first aspect, there is a rotor system including a hub; a rim configured to rotate about the hub, the rim including an interior surface and an engagement surface; a plurality of rotor blades extending from the hub and coupled to the interior surface of the rim; and one or more outer drive gears disposed adjacent to the engagement surface of the rim; each of the one or more outer drive gears including a plurality of teeth for engaging the engagement surface of the rim; wherein the one or more outer drive gears are configured to rotate the rim such that the plurality of rotor blades rotates about the hub.

In an embodiment, each of the plurality of rotor blades has an inboard portion and an outboard portion, the inboard portion is configured to be coupled to the hub, and the outboard portion is configured to be coupled to the rim.

In another embodiment, the outboard portion of each of the plurality of rotor blades includes a blade tip that collectively define a circumference, and the rim is configured to be coupled to each blade tip such that the rim extends about the circumference.

In one embodiment, each of the one or more outer drive gears can be rotated independently.

In still another embodiment, the engagement surface is disposed on an exterior portion of the rim.

In yet another embodiment, the one or more outer drive gears can be rotated by at least one of an electric motor, a hydraulic motor.

In an embodiment, the hub is only rotated by the rim.

In one embodiment, the rim and the plurality of rotor blades comprise a unitary member.

In a second aspect, there is provided an aircraft rotor system including a first hub having a first hub axis about which the first hub is configured to rotate; a first plurality of rotor blades configured to extend from the first hub and rotate about the first hub axis; wherein the first hub is configured to be rotated about the first hub axis only by the first plurality of rotor blades.

In an embodiment, the system includes a first rim configured to extend about the first hub and including a first engagement surface; and a first interior surface configured to be coupled to at least one rotor blade of the first plurality of rotor blades.

In one embodiment, the system includes one or more outer drive gears disposed adjacent to the first engagement surface of the first rim including a plurality of teeth for engaging the first engagement surface of the first rim; wherein the one or more outer drive gears are configured to rotate the first rim such that the first plurality of rotor blades rotates about the first hub.

In another embodiment, the one or more outer drive gears are disposed at equidistant points about the first engagement surface of the first rim.

In still another embodiment, each of the one or more outer drive gears are configured to be rotated independently.

In yet another embodiment, a second hub having a second hub axis about which the second hub is configured to rotate; a second plurality of rotor blades configured to extend from the second hub and rotate about the second hub axis; a second rim configured to extend about the second hub and including a second engagement surface; and a second interior surface configured to be coupled to at least one rotor blade of the second plurality of rotor blades; and an outer drive gear disposed adjacent to the first engagement surface of the first rim and the second engagement surface of the second rim, the outer drive gear including a plurality of teeth for engaging the first engagement surface of the first rim and the second engagement surface of the second rim; wherein the outer drive gear is configured to rotate the first rim and the second rim.

In an embodiment, the first rim rotates in a first direction and the second rim rotates in a second direction such that the first direction and the second direction are different directions.

In one embodiment, the outer drive gear is at least one of the following: a spiral bevel gear, a bevel gear, and a face gear.

In a third aspect, there is a method of operating an aircraft rotor system including providing a first rotor assembly, including a first hub; a first rim configured to rotate about the first hub, the first rim including a first interior surface and a first engagement surface; and a first plurality of rotor blades extending from the first hub and coupled to the first interior surface of the first rim; providing a first drive gear disposed adjacent to the engagement surface of the first rim; and rotating the first drive gear to impart rotation to the first rotor assembly.

In an embodiment, the method includes providing a second drive gear disposed adjacent to the engagement surface of the first rim; rotating the second rive gear to impart rotation to the first rotor assembly.

In one embodiment, the method includes providing a second rotor assembly including a second hub; a second rim configured to rotate about the second hub, the second rim including a second interior surface and a second engagement surface; and a second plurality of rotor blades extending from the second hub and coupled to the second interior surface of the second rim; wherein the step of rotating the first drive gear imparts rotation to the second rotor assembly.

In an embodiment, the first plurality of rotor blades and the second plurality of rotor blades rotate in different directions.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Figure 1:
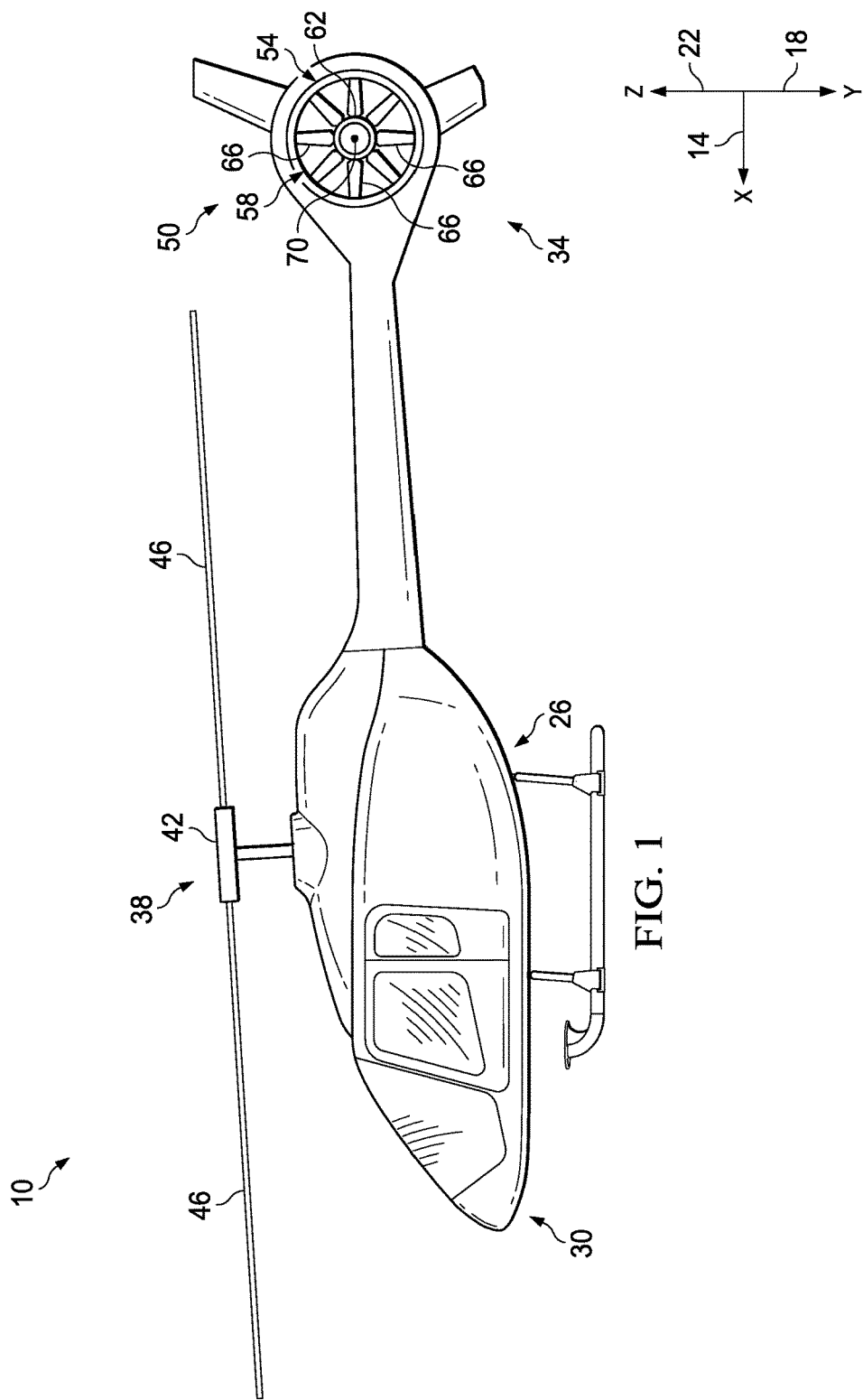
FIG. 1 is a side view of an aircraft, according to one example embodiment.

Illustrative embodiments of rotor systems and methods are described below. In the interest of clarity, all features of an actual implementation may not be described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, assemblies, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the devices, members, assemblies, etc. described herein may be oriented in any desired direction.

This disclosure depicts and describes rotor systems, components and features thereof, and methods relating thereto. Any rotor system, component and feature thereof, or method relating thereto depicted in FIGS. 1-10 and/or described herein can be used with the aircrafts depicted in FIGS. 1 and 4. Additionally, the rotor systems, components and features thereof, and methods relating thereto depicted and/or described herein can be used with any aircraft having one or more rotor assemblies, including tiltrotor aircrafts, helicopters, tilt wing aircrafts, unmanned aerial vehicles (UAVs), hovercrafts, and other vertical lift or VTOL aircrafts, or can further be used with any device having one or more components having rotor assemblies, including devices with propellers, windmills, and turbines. Further, any features of one embodiment of the rotor systems or components thereof in this disclosure can be used with any other embodiment of the rotor systems or components thereof in this disclosure such that the other embodiment has the same or similar features, operates in the same or similar way, or achieves the same or similar functions. Some components of this disclosure are depicted by graphic shapes and symbols. Unless this disclosure specifies otherwise, such components should be understood to include the same or similar characteristics and features as those components that are named or described, though the graphic shapes and symbols may not depict each such characteristic or feature.

FIG. 1 depicts aircraft 10 and three mutually orthogonal directions X, Y, and Z forming a three-dimensional frame of reference XYZ. Longitudinal axis X 14 extends through the center of aircraft 10 in the fore and aft directions. Transverse axis Y 18 is perpendicular to longitudinal axis X 14. The X-Y plane is considered to be "horizontal." Vertical axis Z 22 is oriented perpendicularly with respect to the X-Y plane. The X-Z plane and Y-Z plane are considered to be "vertical."

Aircraft 10 includes fuselage 26 as a central main body. Fuselage 26 extends parallel to longitudinal axis 14 from a fuselage front end 30 to a fuselage rear end 34. Aircraft 10 further includes a main rotor assembly 38, including hub 42 and plurality of rotor blades 46. Aircraft 10 and components thereof, such as main rotor assembly 38, can, for example, be coupled to and controlled with a power system connected to a drive system, such as one continuous drive system or a segmented drive system separated by a gearbox, including electric propulsion systems, hydraulic drive systems, or conventional drive systems. Main rotor assembly 38 is controllable and positionable to, for example, enable control of direction, thrust, and lift of aircraft 10. For example, main rotor assembly 38 can, if activated, provide a lifting thrust to aircraft 10 during takeoff and landing to enable aircraft 10 to move substantially in the Z direction. Furthermore, main rotor assembly 38 can, if activated, provide a forward thrust to aircraft 10 to enable aircraft 10 to move substantially in the X direction.

Figure 2:
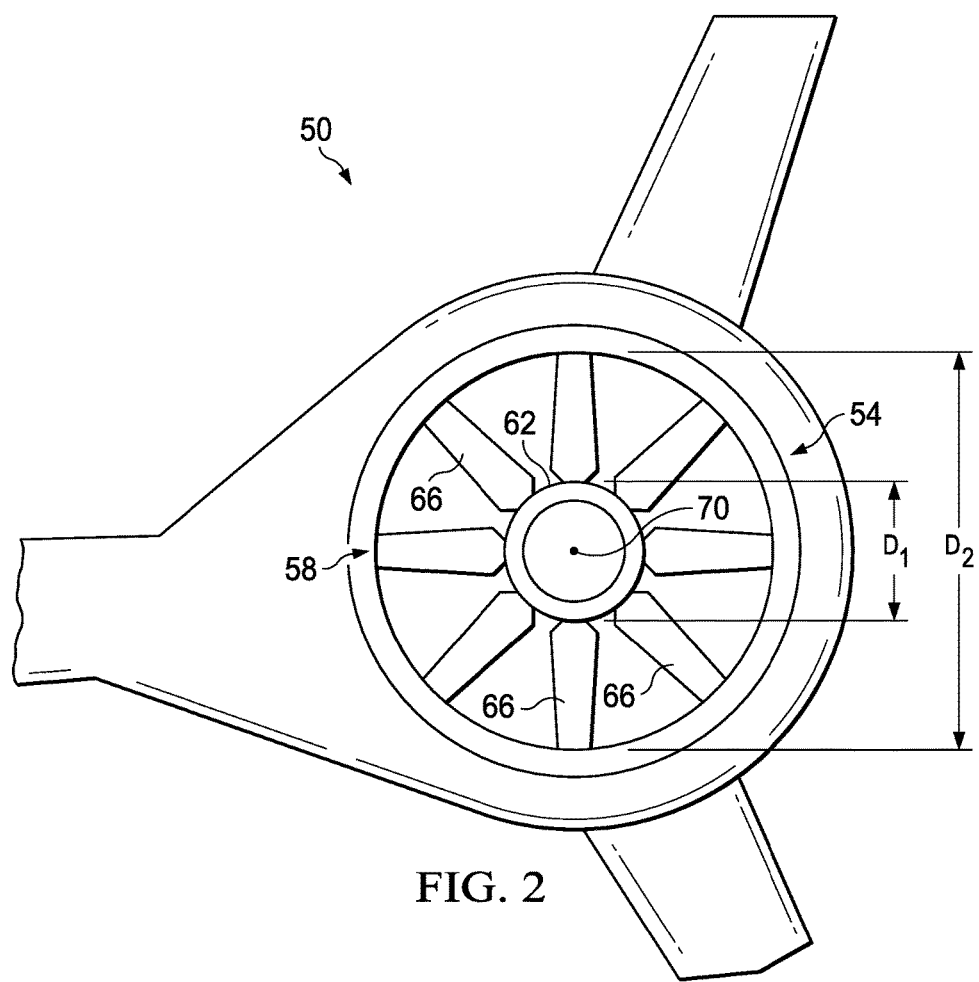
FIG. 2 is a side view of a portion of an aircraft, according to one example embodiment.

As shown in FIGS. 1-2, fuselage rear end 34 of aircraft 10 further includes tail 50, which has rotor system 54. Rotor system 54 can, if activated, counteract torque created by activation of main rotor assembly 38 to, for example, stabilize aircraft 10 and/or prevent aircraft 10 (and, more specifically, fuselage 26) from rotating in the opposite direction that main rotor assembly 38 rotates. In the embodiment shown, rotor system 54 includes rotor assembly 58. Rotor assembly 58 has hub 62 and plurality of rotor blades 66 configured to extend from and rotate about hub 62 (and are depicted extending from hub 62 in the embodiments shown). Both hub 62 and plurality of rotor blades 66 rotate about hub axis 70.

Though not depicted, hub 62 is configured to be coupled to a drive system. The drive system can be, for example, one continuous drive system or a segmented drive system separated by a gearbox, including electric propulsion systems, hydraulic drive systems, or conventional drive systems. For example, hub 62 can be coupled to a drive shaft that is rotated by the drive system such that the drive shaft rotates hub 62, and hub 62 rotates the plurality of rotor blades 66. As shown in FIG. 2, hub 62 is sized to enable hub 62 to accommodate one or more components related to the drive system and/or components related to the coupling of the drive system to hub 62. As one example, rotor assembly 58 would require a tail rotor gearbox to change the torque direction coming from the turbine engine by ninety degrees to deliver torque to hub 62. For example, in the embodiment shown, a diameter $D_1$ of hub 62 is at least 15% (e.g., 15%, 20%, 25%, 30%, 35%, or more) of a diameter $D_2$ of rotor assembly 58.

Figure 3:
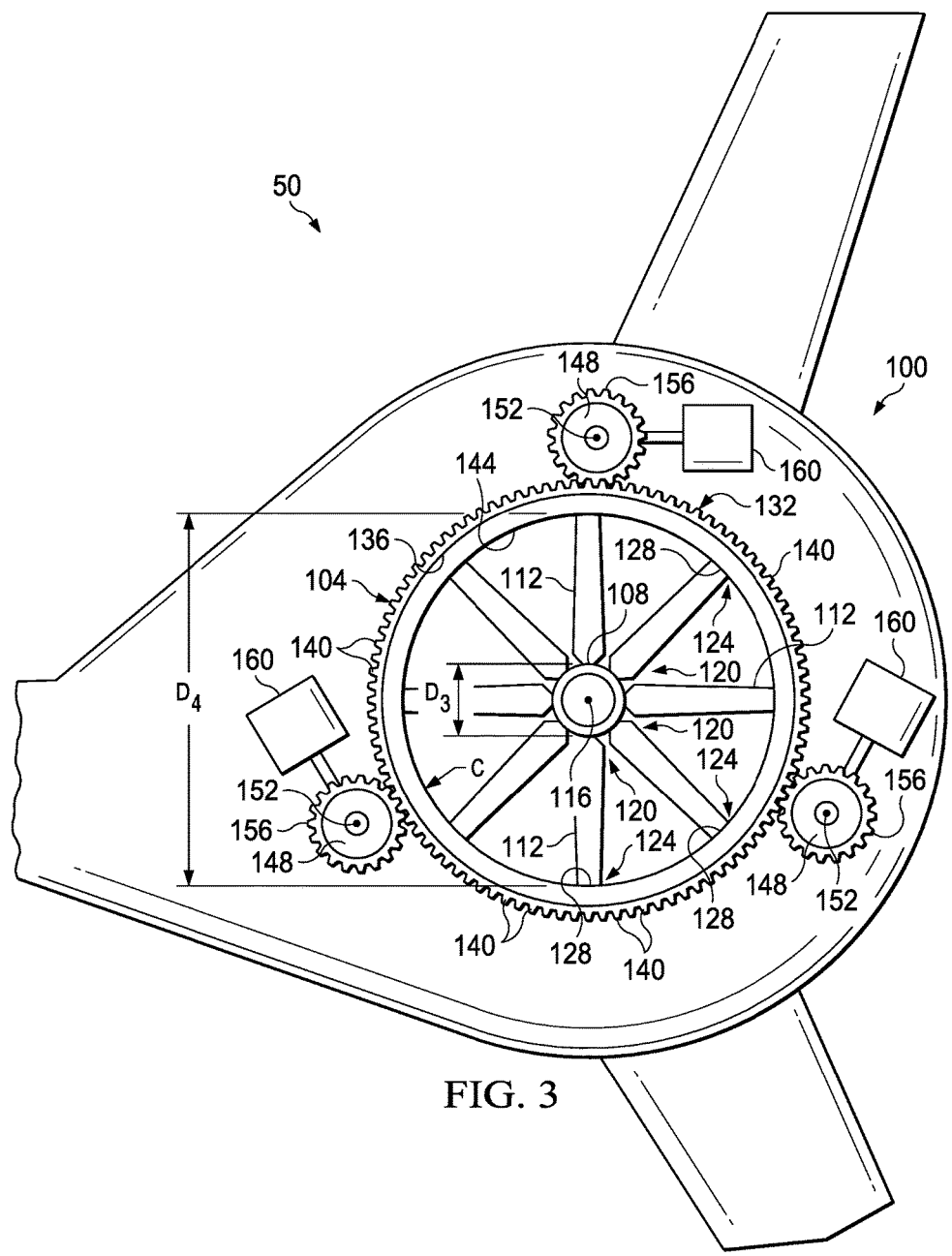
FIG. 3 is a cross-sectional view of a tail portion of an aircraft, according to one example embodiment.

As shown in FIG. 3, tail 50 of aircraft 10 can also be configured to include rotor system 100. Rotor system 100 can, if activated, counteract torque created by activation of main rotor assembly 38 to, for example, stabilize aircraft 10 and/or prevent aircraft 10 (and, more specifically, fuselage 26) from rotating in the opposite direction that main rotor assembly 38 rotates. In the embodiment shown, rotor system 100 includes at least one rotor assembly 104 (e.g., one rotor assembly 104, in the embodiment shown in FIG. 3). Rotor assembly 104 has hub 108 and plurality of rotor blades 112 configured to extend from and rotate about hub 108 (and are depicted extending from hub 108). Both hub 108 and plurality of rotor blades 112 rotate about hub axis 116. As shown in FIG. 3, each of plurality of rotor blades 112 includes inboard portion 120, which is configured to be coupled to hub 108 (and is depicted coupled to hub 108 in the embodiment shown), and outboard portion 124 that ends in blade tip 128. In the embodiment shown, each of plurality of rotor blades 112 extends from hub 108 by substantially the same distance and, therefore, blade tips 128 of plurality of rotor blades 112 collectively define circumference C, which also corresponds to the distance that each blade tip 128 rotates about hub 108, if rotor assembly 104 is rotated.

In the embodiment shown in FIG. 3, hub 108 is not required to be coupled to a drive system and, therefore, hub 108 is not required to be sized to enable hub 108 to accommodate one or more components related to the drive system and/or components related to the coupling of the drive system to hub 108. In other words, rotor system 100 is configured to apply torque to rotate rotor assembly 104 at a position separate from hub 108. For example, in the embodiment shown, a diameter $D_3$ of hub 108 is equal to or less than 20% (e.g., 20%, 15%, 10%, 5%, or less) of a diameter $D_4$ of rotor assembly 104. By comparison, diameter $D_3$ of hub 108 is at least 5% less than (e.g., 5%, 10%, 15%, 20%, 25% less than, or more) diameter $D_1$ of hub 62, if, for example, all other components of aircraft 10 remain substantially equal in size.

Rotor assembly 104 further includes rim 132 (e.g., one rim 132, in the embodiment shown in FIG. 3) that is configured to extend about hub 108 (and is depicted extending about hub 108). Rim 132 is coaxial with hub 108 and rotates about hub axis 116. Rim 132 includes exterior portion 136 with an engagement surface 140 (e.g., gear teeth) disposed thereon. The engagement surface 140 is disposed on the outer circumference surface of the rim 132.

In some embodiments, engagement surface 140 is disposed on at least one of the sides of the rim 132. Engagement surface 140 is configured to be coupled to and/or engaged with corresponding teeth of another component (e.g., such as another gear). In some embodiments, the engagement surface 140 is formed substantially in the shape of cylinder to form a cylindrical rim. In other embodiments, the engagement surface 140 is conically shaped to form a conical rim. It should be appreciated that engagement surface 140 may take on a wide variety of configurations suitable for engaging with one or more outer drive gears 148. Rim 132 further includes interior surface 144. Rim 132 (and, more specifically, interior surface 144) and at least one rotor blade of the plurality of rotor blades 112 (e.g., outboard portions 124 and/or blade tips 128) are configured to be coupled to each other (and are depicted coupled to each other in the embodiment shown in FIG. 3). Interior surface 144 can have substantially the same circumference C as that defined by blade tips 128 of plurality of rotor blades 112 such that rim 132 extends about circumference C.

In some embodiments, rotor assembly 104 does not include a hub 108. In an illustrative embodiment, rotor assembly without a hub 108 can include at least one rotor blade 112 extending from diametrically opposed points on the interior surface 144 of rim 132. In other embodiments, rotor assembly 104 can include a non-rotating hub 108.

In some embodiments, the rotor assembly 104 can include a unitary portion. For example, rotor assembly 104 (or one or more components of rotor assembly 104, such as one or more of plurality of rotor blades 112, hub 108, and, rim 132) can be formed of the same material and/or at the same time. As one example, rotor assembly 104 could be produced from a single casting or forging and then machined to the final shape. In other embodiments, one or more of outboard portions 124 of plurality of rotor blades 112 are coupled and integral to rim 132 (including at least one of the exterior portion 136, interior surface 144, and engagement surface 140). For example, one or more of plurality of rotor blades 112, such as one or more of blades tips 128, can be coupled to interior surface 144 of rim 132 by fastening and/or by removing a portion of interior surface 144 to accommodate one or more of blade tips 128. As another example, if plurality of rotor blades 112 and interior surface 144 of rim 132 are a unitary member (e.g., made of the same material and/or at the same time), interior surface 144 can be coupled to the exterior portion 136 of rim 132 by, for example, an adhesive and/or by fastening. As still another example, if plurality of rotor blades 112, interior surface 144, and exterior portion 136 of rim 132 are unitary (e.g., made of the same material and/or at the same time), exterior portion 136 can be coupled to engagement surface 140 by, for example, an adhesive and/or fastening. In another example, hub 108 and rim 132 would be fixed together with a plurality of rods that are coaxial with each blade 112, such that each rod passes through the interior of the blades 112. This would allow the blades 112 to pivot about the rod such that blade pitch can be altered by conventional methods. In an embodiment, the rotor assembly 104 can include at least one composite unitary member, metal unitary member, and combinations thereof.

Rotor system 100 further includes one or more outer drive gears 148 (e.g., three outer drive gear 148, in the embodiment shown in FIG. 3). Each of outer drive gears 148 are configured to rotate about outer gear axis 152. Outer gear axis 152 is substantially parallel to the hub axis 116. The outer drive gears 148 can be arranged in a radial pattern about the rotor assembly 104 and are disposed outward of the engagement surface 140, as shown in FIG. 3. Each outer drive gear 148 includes a plurality of teeth 156, which are configured to be coupled to and/or engaged with engagement surface 140 of rim 132, such that, if the engagement surface 140 of rim 132 and plurality of teeth 156 of outer drive gear 148 are coupled and/or engaged, and if outer drive gear 148 are rotated, rim 132 rotates. For example, in the embodiment shown in FIG. 3, if one or more of the outer drive gears 148 are rotated, rim 132 is rotated, and plurality of rotor blades 112 and hub 108 are rotated about hub axis 116. In the embodiment shown in FIG. 3, rotor system 100 is configured such that hub 108 can be rotated only by one or more rims 132 and/or the one or more outer drive gears 148 via one or more of plurality of rotor blades 112 (e.g., and not by one or more conventional drive systems directly coupled to hub 108). In other words, rotor system 100 is configured such that hub 108 can be rotated by one or more of plurality of rotor blades 112, which are rotated by rim 132, which is rotated by at least one outer drive gear 148.

In the embodiment shown in FIG. 3, each of outer drive gears 148 is configured to be coupled to a different power source (e.g., power sources 160), each of which is configured to independently rotate the outer drive gear to which it is coupled. FIG. 3 shows power source 160 to be perpendicular to axis 152, power source 160 can also be coaxial to axis 152. Power sources 160 can include, for example, electric power sources (e.g., electric motors), hydraulic power sources (e.g., hydraulic motors), and/or pneumatic power sources (e.g., pneumatic motors).

In some embodiments, rotor system 100 includes less than three outer drive gears 148 (e.g., two or one outer drive gear 148); and, in other embodiments, rotor system 100 includes more than three outer drive gears 148 (e.g., four, five, six, seven, or more outer drive gears 148). The number and size (e.g., diameter) of outer drive gears 148 in rotor system 100 can depend for example, on a desired maximum and/or fixed speed of rotation for rim 132. For example, in some embodiments, one or more outer drive gears 148 are configured to rotate at least 1.5 times faster than rim 132 (e.g., 1.5 times faster, 2 times faster, 2.5 times faster, 3 times faster, 3.5 times faster, 4 times faster, 4.5 times faster, 5 times faster, or more). The number and size (e.g., diameter) of outer drive gear 148 in rotor system 100 can also depend, for example, on a desired power input for each outer drive gear 148. For example, in some embodiments, if a desired power input for each outer drive gear 148 is low, rotor system 100 may include more outer drive gears 148 and/or smaller-sized (e.g., having smaller diameters) outer drive gears 148; and, if a desired power input for each outer drive gear 148 is high, rotor system 100 may include less outer drive gears 148 and/or larger-sized (e.g., having larger diameters) outer drive gears 148. Rotor system 100 is configured to enable all of outer drive gear 148 to be rotated; and, in some embodiments, fewer than all of outer drive gear 148 can be rotated, such as if one or more of outer drive gear 148 fail, if one or more of outer drive gear 148 are not rotated to conserve power, and/or if one or more outer drive gear 148 are not required to attain a desired maximum and/or fixed speed of rotation for rim 132. In one example, outer drive gear 148 could each include a sprag clutch so that when rotation of outer drive gear 148 is not required, or the gear fails, outer drive gear 148 can free-spin about axis 152. In the illustrative embodiment in FIG. 3, the outer drive gear 148 are shown at substantially equidistant points about the outer circumference of rim 132. In some embodiments, the outer drive gear 148 are disposed at non-equidistant points on the outer circumference of the rim 132.

In operation, the embodiment shown in FIG. 3 can function as follows. A method of operating an aircraft rotor system, such as rotor assembly 104 of rotor system 100 of aircraft 10, can include providing a rotor assembly 104 (e.g., plurality of rotor blades 112, and rim 132, and, optionally, hub 108); providing a drive gear (e.g., at least one outer drive gear 148 having teeth 156) disposed adjacent to the engagement surface 140 of the rim 132 in the rotor assembly 104; and rotating the drive gear having a plurality of teeth (e.g., at least one outer drive gear 148 having teeth 156) to impart rotation to the rotor assembly 104. The method can further include providing and rotating a second drive gear, a third drive gear, a fourth drive gear, a fifth drive gear, a sixth drive gear, and/or a seventh drive gear (e.g., one or more of outer drive gear 148) each having a plurality of teeth that are coupled to the engagement surface 140 of the rim 132 in the rotor assembly 104. Rotating one or more of the outer drive gears 148 and, therefore, rim 132, plurality of rotor blades 112, and hub 108 can include activating one or more power sources (e.g., power sources 160) that are coupled to rotor system 100, such as to one or more of outer drive gear 148.

Figure 4:
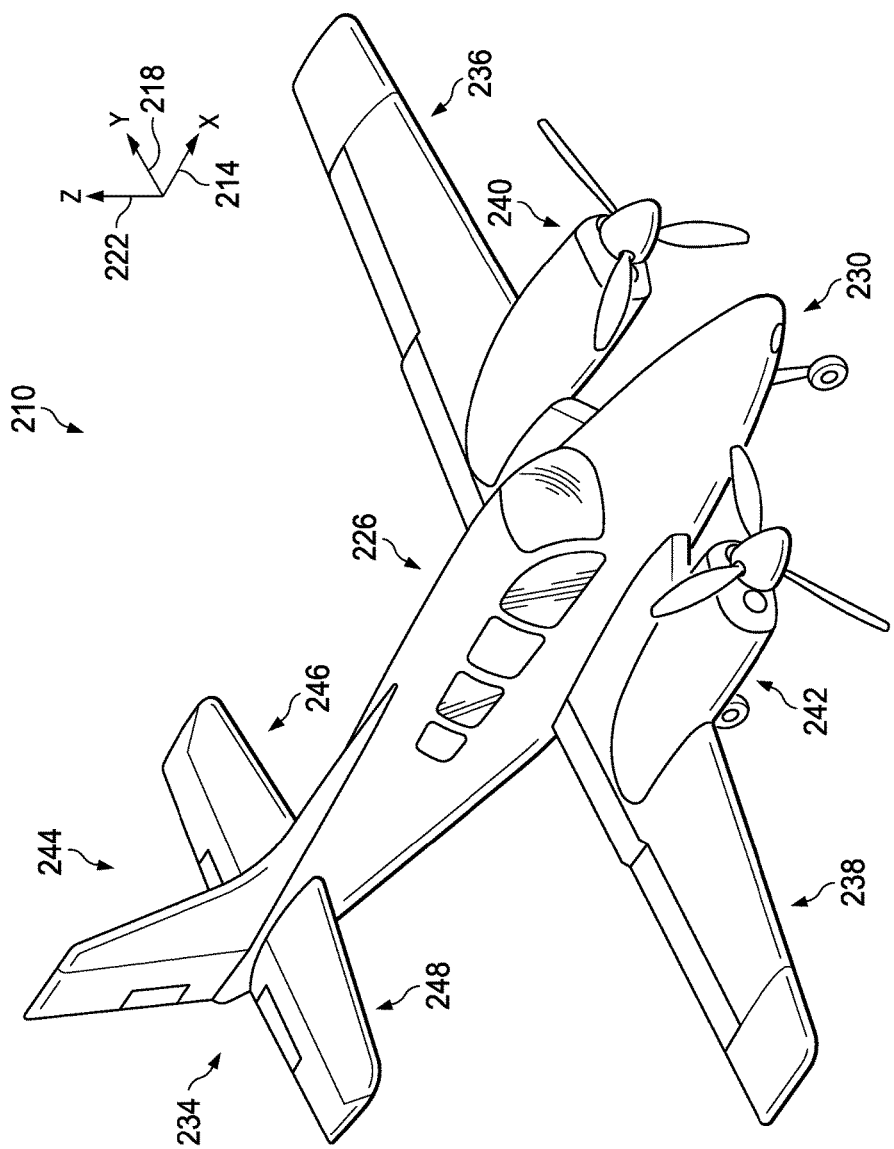
FIG. 4 is a perspective view of another aircraft, according to one example embodiment.

FIG. 4 depicts aircraft 210 and three mutually orthogonal directions X, Y, and Z forming a three-dimensional frame of reference XYZ. Longitudinal axis X 214 extends through the center of aircraft 210 in the fore and aft directions. Transverse axis Y 218 is perpendicular to longitudinal axis. The X-Y plane is considered to be "horizontal." Vertical axis Z 222 is oriented perpendicularly with respect to the X-Y plane. The X-Z plane and Y-Z plane are considered to be "vertical."

Aircraft 210 includes fuselage 226 as a central main body. Fuselage 226 extends parallel to longitudinal axis 214 from a fuselage front end 230 to a fuselage rear end 234. Aircraft 210 includes wing 236 and wing 238 extending from fuselage 226 substantially parallel to transverse axis Y 218. Aircraft 210 further includes propulsion system 240 coupled to wing 236 and propulsion system 242 coupled to wing 238. Fuselage rear end 234 of aircraft 210 also includes tail 244 having tail wing 246 and tail wing 248. Aircraft 210 and components thereof, such as propulsion systems 240 and 242, can, for example, be coupled to and controlled with a power system connected to a drive system, such as one continuous drive system or a segmented drive system separated by a gearbox, including electric propulsion systems, hydraulic drive systems, or conventional drive systems. Propulsion systems 240 and 242 and/or wings 236 and 238 can be controllable and/or positionable to, for example, enable control of direction, thrust, and lift of aircraft 210. For example, propulsion systems 240 and 242 and wings 236 and 238 can provide a forward thrust and a lifting thrust to aircraft 210 during takeoff, during flight, and during landing.

Figure 5:
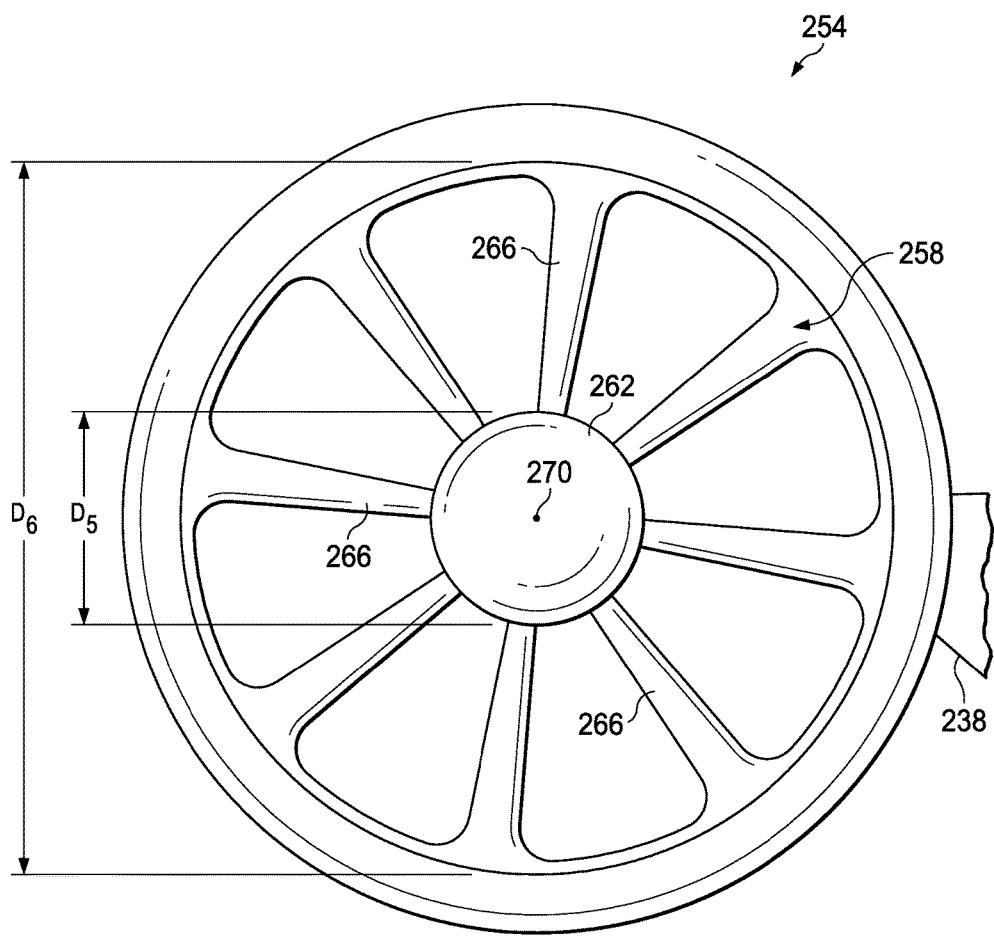
FIG. 5 is a front view of a rotor system for an aircraft, according to one example embodiment.

As shown in FIG. 5, propulsion system 242 can include rotor system 254 in lieu of a traditional propeller system as shown in FIG. 4. Though not depicted, propulsion system 240 can similarly include rotor system 254. Rotor system 254 can, if activated, provide forward thrust to aircraft 210 to enable aircraft 210 to takeoff, fly, and land. In the embodiment shown, rotor system 254 includes rotor assembly 258. Rotor assembly 258 has hub 262 and plurality of rotor blades 266 configured to extend from and rotate about hub 262 (and are depicted extending from hub 262 in the embodiments shown). Both hub 262 and plurality of rotor blades 266 rotate about hub axis 270.

Though not depicted, hub 262 is configured to be coupled to a drive system. The drive system can be, for example, one continuous drive system or a segmented drive system separated by a gearbox, including electric propulsion systems, hydraulic drive systems, or conventional drive systems. For example, hub 262 can be coupled to a drive shaft that is rotated by the drive system such that the drive shaft rotates hub 262, and hub 262 rotates the plurality of rotor blades 266. As shown in FIG. 5, hub 262 is sized to enable hub 262 to accommodate one or more components related to the drive system and/or components related to the coupling of the drive system to hub 262. For example, in the embodiment shown, a diameter $D_5$ of hub 262 is at least 15% (e.g., 15%, 20%, 25%, 30%, 35%, or more) of a diameter $D_6$ of rotor assembly 258.

Figure 6:
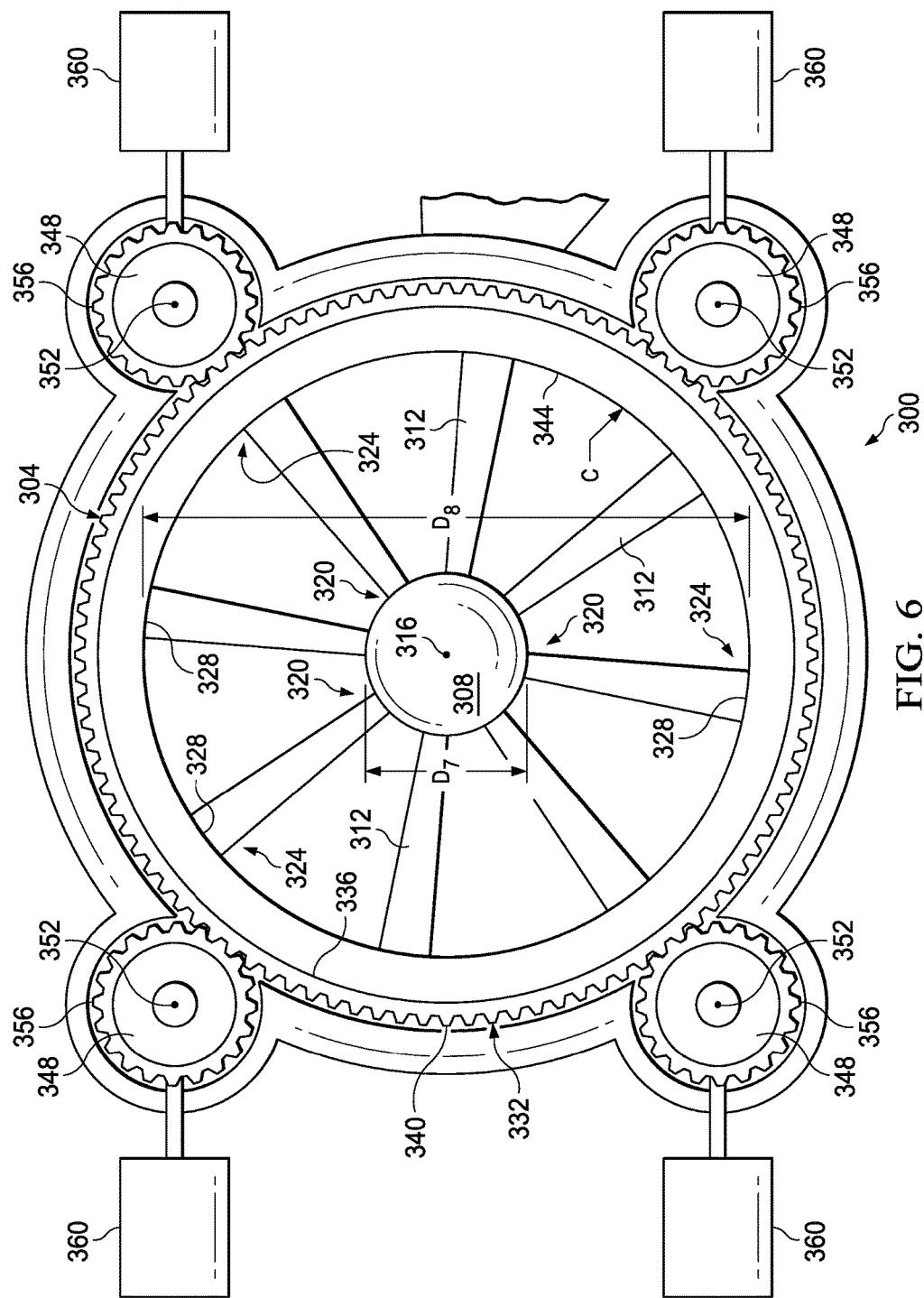
FIG. 6 is a cross-sectional view of a rotor system of an aircraft, according to one example embodiment.

As shown in FIG. 6, propulsion system 242 can be configured to include rotor system 300. Though not depicted, propulsion system 240 can similarly be configured to include rotor system 300. Certain components of rotor system 300 are as described above in connection with rotor system 100. Those components bear similar reference characters to the components of rotor system 100, but with a leading "3" rather than a leading "1". Rotor system 300 can, if activated, provide forward thrust to aircraft 210 to enable aircraft 210 to takeoff, fly, and land. In the embodiment shown, rotor system 300 includes at least one rotor assembly 304 (e.g., one rotor assembly 304, in the embodiment shown in FIG. 6). Rotor assembly 304 has hub 308 and plurality of rotor blades 312 configured to extend from and rotate about hub 308 (and are depicted extending from hub 308). Both hub 308 and plurality of rotor blades 312 rotate about hub axis 316. As shown in FIG. 6, each of plurality of rotor blades 312 includes inboard portion 320, which is configured to be coupled to hub 308 (and is depicted coupled to hub 308 in the embodiment shown), and outboard portion 324 that ends in blade tip 328. In the embodiment shown, each of plurality of rotor blades 312 extends from hub 308 by substantially the same distance and, therefore, blade tips 328 of plurality of rotor blades 312 collectively define circumference C, which also corresponds to the distance that each blade tip 328 rotates about hub 308, if rotor assembly 304 is rotated.

In the embodiment shown in FIG. 6, hub 308 is not required to be coupled to a drive system and, therefore, hub 308 is not required to be sized to enable hub 308 to accommodate one or more components related to the drive system and/or components related to the coupling of the drive system to hub 308. In other words, rotor system 300 is configured to apply torque to rotate rotor assembly 304 at a position separate from hub 308. For example, in the embodiment shown, a diameter $D_7$ of hub 308 is equal to or less than 20% (e.g., 20%, 15%, 10%, 5%, or less) of a diameter $D_8$ of rotor assembly 304. By comparison, diameter $D_7$ of hub 308 is at least 5% less than (e.g., 5%, 10%, 15%, 20%, 25% less than, or more) diameter $D_5$ of hub 262, if, for example, all other components of aircraft 210 remain substantially equal in size.

Rotor assembly 304 further includes rim 332 (e.g., one rim 332, in the embodiment shown in FIG. 6) that is configured to extend about hub 308 (and is depicted extending about hub 308). Rim 332 is coaxial with hub 308 and rotates about hub axis 316. Rim 332 includes an exterior portion 336 with an engagement surface 340 (e.g., gear teeth), which is configured to be coupled to and/or engaged with corresponding teeth of another component (e.g., such as another gear) as described herein. Rim 332 further includes interior surface 344. Rim 332 (and, more specifically, interior surface 344) and at least one rotor blade of the plurality of rotor blades 312 (e.g., outboard portions 324 and/or blade tips 328) are configured to be coupled to each other (and are depicted coupled to each of other in the embodiment shown in FIG. 6). Interior surface 344 can have substantially the same circumference C as that defined by blade tips 328 of plurality of rotor blades 312 such that rim 332 extends about circumference C.

Rotor system 300 further includes one or more outer drive gears 348 (e.g., four outer drive gear 348, in the embodiment shown in FIG. 6). Each of the outer drive gears 348 are configured to rotate about outer gear axis 352. Each of the outer drive gears 348 includes a plurality of teeth 356, which are configured to be coupled to and/or engaged with engagement surface 340 of rim 332, such that, if engagement surface 340 of rim 332 and plurality of teeth 356 of outer drive gear 348 are coupled and/or engaged, and if one of rim 332 or outer drive gear 348 is rotated, the other of rim 332 or outer drive gear 348 rotates. For example, in the embodiment shown in FIG. 6, if one or more of outer drive gears 348 are rotated, rim 332 is rotated, and plurality of rotor blades 312 and hub 308 are rotated about hub axis 316. In the embodiment shown in FIG. 6, rotor system 300 is configured such that hub 308 can be rotated only by one or more rims 332 and/or one or more outer drive gear 348 via one or more of plurality of rotor blades 312 (e.g., and not by one or more traditional drive systems coupled directly to hub 308). In other words, rotor system 300 is configured such that hub 308 can be rotated by one or more of plurality of rotor blades 312, which are rotated by rim 332, which is rotated by at least one outer drive gear 348.

In some embodiments, rotor system 300 includes less than four outer drive gears 348 (e.g., three, two, or one outer drive gear 348); and, in other embodiments, rotor system 300 includes more than three outer drive gears 348 (e.g., five, six, seven, or more outer drive gear 348). The number and size (e.g., diameter) of the outer drive gears 348 in rotor system 300 can depend for example, on a desired maximum and/or fixed speed of rotation for rim 332. In an embodiment, one or more outer drive gears can be a plurality of outer drive gears 348. For example, in some embodiments, one or more outer drive gears 348 are configured to rotate at least 1.5 times faster than rim 332 (e.g., 1.5 times faster, 2 times faster, 2.5 times faster, 3 times faster, 3.5 times faster, 4 times faster, 4.5 times faster, 5 times faster, or more). The number and size (e.g., diameter) of the outer drive gears 348 in rotor system 300 can also depend, for example, on a desired power input for each outer drive gear 348. For example, in some embodiments, if a desired power input for each outer drive gear 348 is low, rotor system 300 may include more outer drive gears 348 and/or smaller-sized (e.g., having smaller diameters) outer drive gears 348; and, if a desired power input for each outer drive gear 348 is high, rotor system 300 may include less outer drive gears 348 and/or larger-sized (e.g., having larger diameters) outer drive gears 348. Rotor system 300 is configured to enable all of the outer drive gears 348 to be rotated; and, in some embodiments, fewer than all of outer drive gear 348 can be rotated, such as if one or more of outer drive gear 348 fail, if one or more of outer drive gear 348 are not rotated to conserve power, and/or if one or more outer drive gear 348 are not required to attain a desired maximum and/or fixed speed of rotation for rim 332. In one example, outer drive gear 348 could each include a sprag clutch so that when rotation of outer drive gear 348 is not required, or the gear fails, outer drive gear 348 can free-spin about axis 352. In the embodiment shown, there can be two pairs of diametrically opposed outer drive gear 348.

In operation, the embodiment shown in FIG. 6 can function as follows. A method of operating an aircraft rotor system, such as rotor assembly 304 of rotor system 300 of aircraft 210, can include providing a rotor assembly 304 (e.g., plurality of rotor blades 312, and rim 332, and, optionally, hub 308); providing a drive gear (e.g., at least one outer drive gear 348 having teeth 356) disposed adjacent to the engagement surface 340 of the rim 332 in the rotor assembly 304; and rotating the drive gear having a plurality of teeth (e.g., at least one outer drive gear 348 having teeth 356) to impart rotation to the rotor assembly 304. The method can further include providing and rotating a second drive gear, third drive gear, a fourth drive gear, a fifth drive gear, a sixth drive gear, and/or a seventh drive gear (e.g., one or more outer drive gears 348) each having a plurality of teeth that are coupled to the engagement surface 340 of the rim 332 of in the rotor assembly 304. Rotating one or more of outer drive gear 348 and, therefore, rim 332, plurality of rotor blades 312, and hub 308 can include activating one or more power sources (e.g., power sources 360) that are coupled to rotor system 300, such as to one or more of outer drive gear 348.

Figure 7:
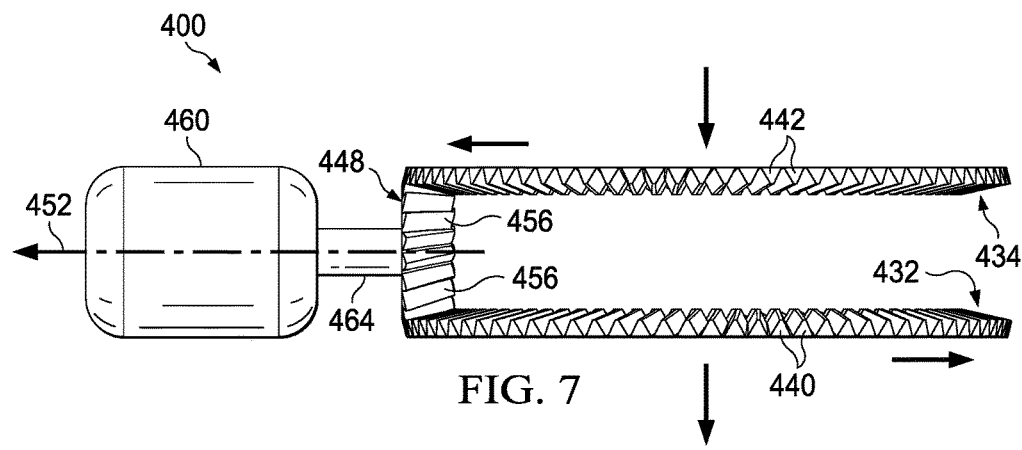
FIG. 7 is a top view of a portion of a rotor system, according to one example embodiment.
Figure 8:
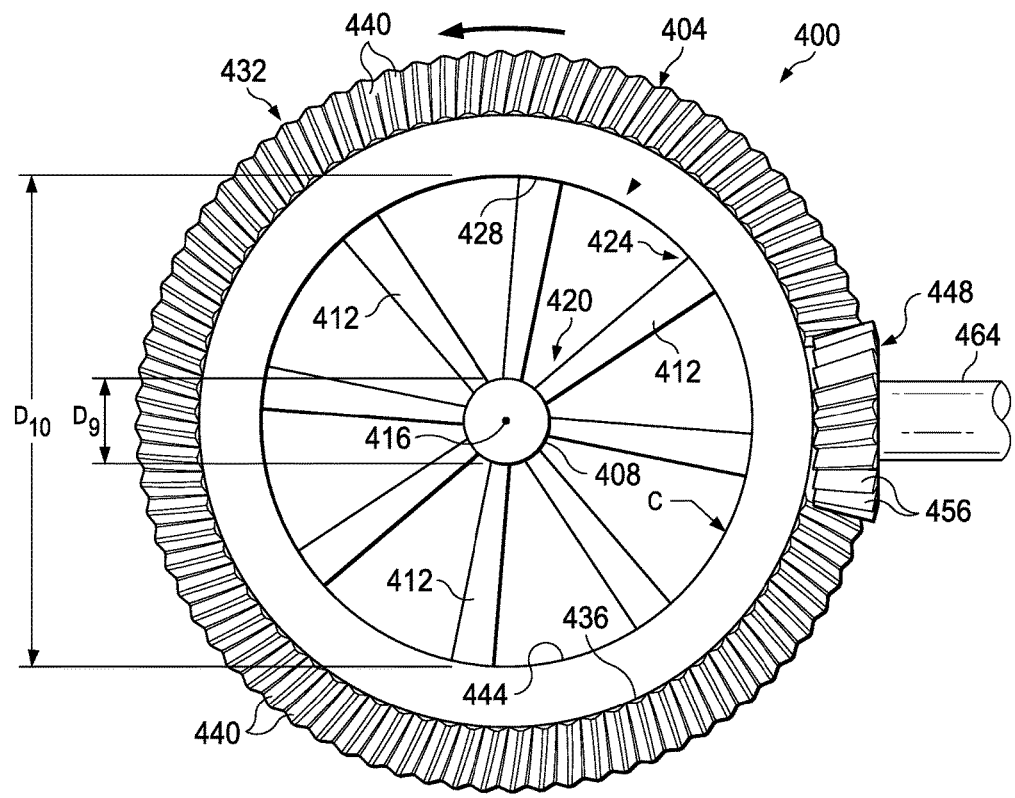
FIG. 8 is a side view of a portion of a rotor system, according to one example embodiment.
Figure 9:
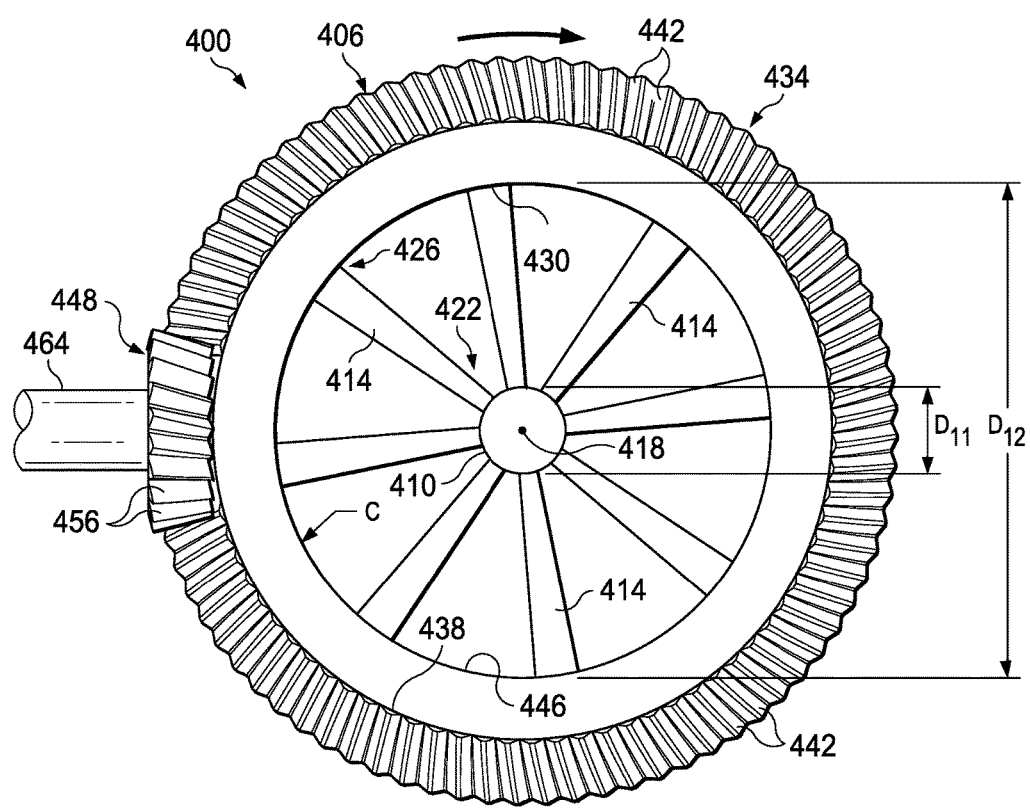
FIG. 9 is a side view of a portion of a rotor system, according to one example embodiment.

FIGS. 7-9 depict another embodiment of the present rotor systems. Rotor system 400 can, if activated, provide thrust with contra-rotating rotor assemblies to assist in enabling an aircraft to takeoff, fly, and land. Rotor system 400 can be used, for example, in any VTOL aircraft, such as a hovercraft, and does not require a separate rotor assembly to counteract torque because the contra-rotating rotor assemblies of rotor assembly 400 can operate in a configuration that does not produce a torque to counteract. In the embodiment shown, rotor system 400 includes at least two rotor assemblies (e.g., first and second rotor assemblies 404 and 406, in the embodiment shown in FIGS. 7-9). Certain components of the rotor system 400 are as described above in connection with rotor systems 100, 200, 300 and bear similar reference characters but with a leading "4". First rotor assembly 404 has first hub 408, and second rotor assembly 406 has second hub 410. First rotor assembly 404 further includes first plurality of rotor blades 412 configured to extend from and rotate about first hub 408 (and are depicted extending from first hub 408). Both first hub 408 and first plurality of rotor blades 412 rotate about first hub axis 416. Similarly, second rotor assembly 406 further includes second plurality of rotor blades 414 configured to extend from and rotate about second hub 410 (and are depicted extending from second hub 410). Both second hub 410 and second plurality of rotor blades 414 rotate about second hub axis 418. As shown in FIG. 8, each of the first plurality of rotor blades 412 includes inboard portion 420, which is configured to be coupled to first hub 408 (and is depicted coupled to first hub 408 in the embodiment shown), and outboard portion 424 that ends in blade tip 428. In the embodiment shown in FIG. 8, each of first plurality of rotor blades 412 extends from first hub 408 by substantially the same distance and, therefore, blade tips 428 of plurality of rotor blades 412 collectively define circumference C, which also corresponds to the distance that each blade tip 428 rotates about first hub 408, if first rotor assembly 404 is rotated. Similarly, as shown in FIG. 9, each of the second plurality of rotor blades 414 includes inboard portion 422, which is configured to be coupled to second hub 410 (and is depicted coupled to hub 410 in the embodiment shown), and outboard portion 426 that ends in blade tip 430. In the embodiment shown in FIG. 9, each of the second plurality of rotor blades 414 extends from second hub 410 by substantially the same distance and, therefore, blade tips 430 of plurality of rotor blades 414 collectively define circumference C, which also corresponds to the distance that each blade tip 430 rotates about second hub 410, if second rotor assembly 406 is rotated.

In the embodiment shown in FIGS. 7-9, first and second hubs 408, 410 are not required to be coupled to a drive system and, therefore, hubs 408, 410 are not required to be sized to enable hubs 408, 410 to accommodate one or more components related to the drive system and/or components related to the coupling of the drive system to hubs 408, 410. In other words, rotor system 400 is configured to apply torque to rotate first rotor assembly 404 and second rotor assembly 406 at a position separate from first and second hubs 408, 410, respectively. For example, in the embodiment shown, a diameter $D_9$ of first hub 408 is equal to or less than 20% (e.g., 20%, 15%, 10%, 5%, or less) of a diameter $D_{10}$ of first rotor assembly 404. Similarly, a diameter $D_{11}$ of second hub 410 is equal to or less than 20% (e.g., 20%, 15%, 10%, 5%, or less) of a diameter $D_{12}$ of second rotor assembly 406.

Rotor system 400 further includes at least two rims (e.g., first and second rims 432 and 434, in the embodiment shown in FIGS. 7-9). First rim 432 is configured to extend about hub 408 (and is depicted extending about first hub 408), and second rim 434 that is configured to extend about hub 410 (and is depicted extending about second hub 410). First rim 432 is coaxial with first hub 408 and rotates about first hub axis 416, and second rim 434 is coaxial with second hub 410 and rotates about second hub axis 418. First rim 432 includes first exterior portion 436, and second rim 434 includes second exterior portion 438. Further, first exterior portion 436 of first rim 432 includes a first engagement surface 440 (e.g., gear teeth), which configured to be coupled to and/or engaged with corresponding teeth of another component (e.g., such as another gear) as described herein. Similarly, second exterior portion 438 of second rim 434 includes second engagement surface 442 (e.g., gear teeth), which are configured to be coupled to and/or engaged with corresponding teeth of another component (e.g., such as another gear) as described herein. First rim 432 further includes a first interior surface 444. First rim 432 (and, more specifically, first interior surface 444) and at least one rotor blade of the first plurality of rotor blades 412 (e.g., outboard portions 424 and/or blade tips 428) are configured to be coupled to each other (and are depicted coupled to each of other in the embodiment shown in FIG. 8). First interior surface 444 can have substantially the same circumference C as that defined by blade tips 428 of the first plurality of rotor blades 412 such that first rim 432 extends about circumference C. Similarly, second rim 434 further includes second interior surface 446. Second rim 434 (and, more specifically, second interior surface 446) and at least one rotor blade of the second plurality of rotor blades 414 (e.g., outboard portions 426 and/or blade tips 430) are configured to be coupled to each other (and are depicted coupled to each other in the embodiment shown in FIG. 9). Second interior surface 446 can have substantially the same circumference C as that defined by blade tips 430 of plurality of rotor blades 414 such that second rim 434 extends about circumference C.

Rotor system 400 further includes at least one outer drive gear 448 (e.g., one outer drive gear 448, in the embodiment shown in FIGS. 7-9). Outer drive gear 448 is configured to rotate about outer gear axis 452. In some embodiments, outer drive gear 448 can be at least one of the following: a spiral bevel gear, a bevel gear, and a face gear. Outer drive gear 448 includes plurality of teeth 456, which are configured to be coupled to and/or engaged with first engagement surface 440 of first rim 432 and second engagement surface 442 of second rim 434, such that, if first engagement surface 440 of first rim 432 and plurality of teeth 456 of outer drive gear 448 are coupled and/or engaged, and if outer drive gear 448 is rotated, the first rim 432 rotates; and, similarly, if second engagement surface 442 of second rim 434 and plurality of teeth 456 of outer drive gear 448 are coupled and/or engaged, and if outer drive gear 448 is rotated, the second rim 434 rotates. For example, in the embodiment shown in FIGS. 7-9, if outer drive gear 448 is rotated, first rim 432 is rotated, first plurality of rotor blades 412 and first hub 408 are rotated about first hub axis 416 in a first direction, second rim 434 is rotated, and second plurality of rotor blades 414 and second hub 410 are rotated about second hub axis 418 in a second direction, and the first direction and the second direction are different. In other words, rotor system 400 enables first rotor assembly 404 and second rotor assembly 406 to be rotated in different (e.g., opposite) directions to produce thrust in a direction perpendicular to outer gear axis 452 and parallel to first hub axis 416 and second hub axis 418. In the embodiment shown in FIGS. 7-9, rotor system 400 is configured such that first hub 408 can be rotated only by one or more first rims 432 and/or one or more outer drive gear 448 via one or more of first plurality of rotor blades 412 (e.g., and not by one or more traditional drive systems coupled directly to first hub 408). In other words, rotor system 400 is configured such that first hub 408 can be rotated by one or more of first plurality of rotor blades 412, which are rotated by first rim 432, which is rotated by at least one outer drive gear 448. Similarly, rotor system 400 is configured such that second hub 410 can be rotated only by one or more second rims 434 and/or one or more outer drive gear 448 via one or more of second plurality of rotor blades 414 (e.g., and not by one or more traditional drive systems directly coupled to second hub 410). In other words, rotor system 400 is configured such that second hub 410 can be rotated by one or more of second plurality of rotor blades 414, which are rotated by second rim 434, which is rotated by at least one outer drive gear 448.

In the embodiment shown in FIGS. 7-9, outer drive gear 448 is configured to be coupled to power source 460 by shaft 464. In other embodiments that include more than one outer drive gear 448, one or more of outer drive gear 448 are configured to be coupled to independent power sources to enable independent rotation of each outer drive gear 448, or to the same power source that is configured to rotate one or more of outer drive gear 448. Power sources 460 can include, for example, electric power sources (e.g., electric motors), hydraulic power sources (e.g., hydraulic motors), pneumatic power sources (e.g., pneumatic motors), and/or power sources configured to use air moving around and/or through rotor system 400 to provide power to outer drive gear 448.

In some embodiments, rotor system 400 includes more than one outer drive gears 448 (e.g., two, three, four, five, six, or more outer drive gear 448). In some embodiments, rotor system 400 includes less than two rims (e.g., only rim 432); and in other embodiments, rotor system 400 includes more than two rims (e.g., three, four, five, six, or more rims). The number and size (e.g., diameter) of outer drive gears 448 in rotor system 400 can depend for example, on a desired maximum and/or fixed speed of rotation for first and second rims 432 and 434. For example, in some embodiments, outer drive gear 448 is configured to rotate at least 1.5 times faster than rims 432 and 434 (e.g., 1.5 times faster, 2 times faster, 2.5 times faster, 3 times faster, 3.5 times faster, 4 times faster, 4.5 times faster, 5 times faster, or more). The number and size (e.g., diameter) of one or more outer drive gears 448 in rotor system 400 can also depend, for example, on a desired power input for one or more outer drive gears 448. For example, in some embodiments, if a desired power input for one or more outer drive gears 448 is low, rotor system 400 may include more outer drive gears 448 and/or smaller-sized (e.g., having smaller diameters) outer drive gears 448; and, if a desired power input for one or more outer drive gear 448 is high, rotor system 400 may include less outer drive gears 448 and/or larger-sized (e.g., having larger diameters) outer drive gears 448. In an embodiment that includes one or more outer drive gears 448, rotor system 400 is configured to enable all of outer drive gears 448 to be rotated; and, in some embodiments, fewer than all of outer drive gears 448 can be rotated, such as if one or more of outer drive gears 448 fail, if one or more of outer drive gears 448 are not rotated to conserve power, and/or if one or more outer drive gears 448 are not required to attain a desired maximum and/or fixed speed of rotation for first and second rims 432, 434. In one example, outer drive gear 448 could each include a sprag clutch so that when rotation of outer drive gear 448 is not required, or the gear fails, outer drive gear 448 can free-spin about axis 452.

In operation, the embodiment shown in FIGS. 7-9 can function as follows. A method of operating an aircraft rotor system, such as rotor assemblies 404 and 406 of rotor system 400, can include providing a first rotor assembly 404 (e.g., plurality of rotor blades 412, and rim 432, and, optionally, hub 408); providing a second rotor assembly 406 (e.g., plurality of rotor blades 414, and rim 434, and, optional, hub 410); providing a first drive gear (e.g., at least one outer drive gear 448 having teeth 456) disposed adjacent to the first engagement surface 440 of the first rim 432 and the second engagement surface 442 of the second rim 434; and rotating the drive gear having a plurality of teeth (e.g., at least one outer drive gear 448 having teeth 456) to impart rotation to the first rotor assembly 404 and second rotor assembly 406. The method can further include rotating a second drive gear, a third drive gear, a fourth drive gear, a fifth drive gear, a sixth drive gear, and/or a seventh drive gear (e.g., one or more of outer drive gear 448) each having a plurality of teeth that are coupled to the first and second engagements surfaces 440, 442 of the first and second rims 404, 406. Rotating one or more of outer drive gear 448 and, therefore, first and second rotor assemblies 404, 406, can include activating one or more power sources (e.g., power sources 460) that are coupled to rotor system 400, such as to one or more of outer drive gear 448. In some embodiments, the first plurality of rotor blades 412 and the second plurality of rotor blades 414 rotate in a different direction (e.g., opposite directions) to, for example, produce thrust in a direction perpendicular to outer gear axis 452 and parallel to first hub axis 416 and second hub axis 418.

Figure 10:
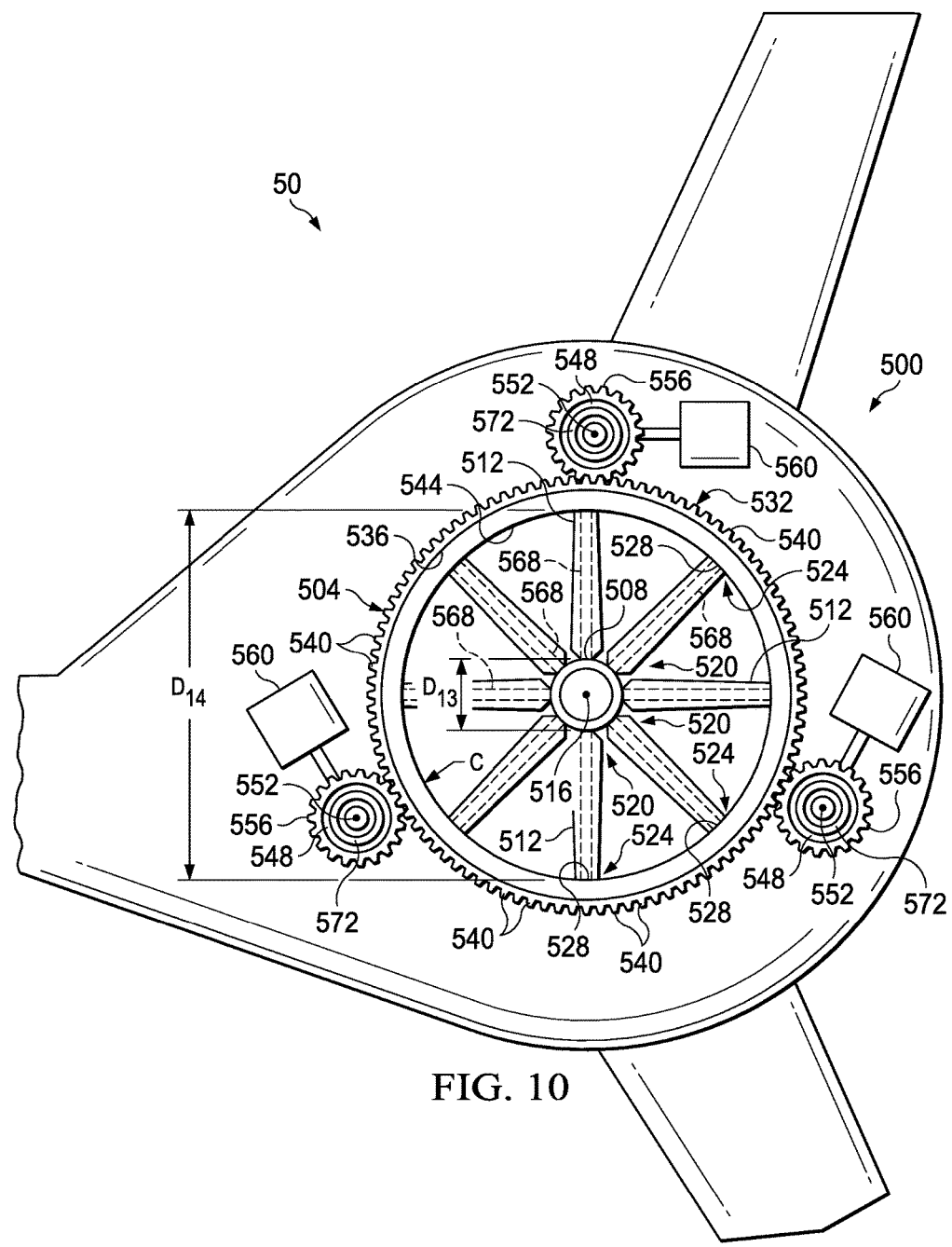
FIG. 10 is a cross-sectional view of a rotor system of an aircraft, according to one example embodiment.

FIG. 10 depicts another embodiment of the present rotor systems. Rotor system 500 includes the same or similar components of rotor systems 100 as described with respect to FIG. 3. Those components include the same or similar characteristics, features, and advantages as the components of FIG. 3 and bear similar reference characters, but with a leading "5" rather than a leading "1." Furthermore, the dimensional components of rotor system 500, such as circumference C, $D_{13}$, and $D_{14}$ of rotor system 500 include the same or similar characteristics, features, and advantages as circumference C, $D_3$, and $D_4$ of FIG. 3, respectively.

In the embodiment shown in FIG. 10, rotor system 500 further includes rods 568. Each rod 568 extends from hub 508 to rim 532. In some embodiments, rods 568 can be coupled to one or both of hub 508 and rim 532 (e.g., by adhesive, fastening, such as with a mechanical attachment, and/or by removing a portion of interior surface 544 to accommodate one or more of blade tips 528); and, in other embodiments, rods 568 can be unitary with one or both of hub 508 and rim 532 (e.g., made of the same material and/or at the same time). In the embodiment shown, each rod 568 is coaxial with a corresponding blade 512, and each rod 568 passes through the interior of the corresponding blade 512. Rotor system 500 is configured such that each blade 512 can pivot about a corresponding rod 568 to, for example, adjust blade pitch (e.g., such as through conventional blade pitch adjustment methods).

In the embodiment shown in FIG. 10, rotor system 500 further includes clutches 572, which can be, for example, sprag clutches. Outer drive gear 548 can each include clutch 572. If rotation of one or more of outer drive gear 548 is not required, or if one or more of outer drive gear 548 fail, clutches 572 can enable free-spin of such outer drive gear 548 about axis 552 to, for example, enable rotor assembly 504 to continue rotating at desirable in-flight speeds.

The rotor systems and methods that are detailed above provide numerous advantages for rotor assemblies and the rotation thereof. For example, with regard to use of the rotor systems and methods with aircrafts, the rotor systems and methods of this disclosure enable the application of torque to rotate rotor assemblies at positions separate from the hub, such as through one or more gears that rotate one or more rotor blades, and the one or more rotor blades rotate the rotor hub. In other words, the present systems and methods reduce and/or eliminate the need for drive shafts and large gear boxes coupled to a rotor hub. The ability to apply torque to rotate a plurality of rotor blades separate from the hub enables the hub to be sized without regard to accommodation of a drive system, to one or more components related to the drive system, and/or to components related to the coupling of the drive system to the hub. Therefore, the present rotor systems enable use of smaller hubs in rotor assemblies, which increases the usable flow area within the rotor assembly, increases rotor assembly efficiency, and decreases weight. Furthermore, the ability to use one or more outer gears to rotate the rotor assembly enables redundancy in the powering of a rotor assembly and eliminates a single point of failure, which decreases the likelihood of rotor system failure and increases safety.

The terms "a" and "an" are defined as one or more unless this disclosure explicitly requires otherwise.

The term "substantially" is defined as largely, but not necessarily wholly, what is specified (and includes what is specified; e.g., substantially 90 degrees includes 90 degrees), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The term "couple" and its derivatives refer to any direct or indirect communication between two or more elements, whether or not those elements are in physical contact with one another.

Terms such as "first" and "second" are used only to differentiate features and not to limit the different features to a particular order or to a particular quantity.

Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, $R_l$, and an upper, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Any numerical range defined by two R numbers as defined in the above is also specifically disclosed and includes the two R numbers.

Use of the term "optionally" with respect to any element of a claim means that the element is required, or alternatively, the element is not required, both alternatives being within the scope of the claim.

Use of broader terms such as comprises, includes, and has (and any derivatives of such terms, such as comprising, including, and having) should be understood to provide support for narrower terms, such as consisting of, consisting essentially of, and comprised substantially of. Thus, in any of the claims, the term "consisting of," "consisting essentially of," or "comprised substantially of" can be substituted for any of the open-ended linking verbs recited above in order to change the scope of a given claim from what it would otherwise be using the open-ended linking verb.

The same or similar features of one or more embodiments are sometimes referred to with the same reference numerals within a figure or among figures. However, one or more features having the same reference numeral should not be construed to indicate that any feature is limited to the characteristics of another feature having the same reference numeral, or that any feature cannot already have, or cannot be modified to have, features that are different from another feature having the same reference numeral.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. The feature or features of one embodiment may be applied to other embodiments to achieve still other embodiments, even though not described, unless expressly prohibited by this disclosure or the nature of the embodiments. The scope of protection is not limited by the description set out above but is defined by the claims that follow, the scope including all equivalents of the subject matter of the claims. Each and every claim is incorporated as further disclosure into the specification and the claims are embodiment(s) of the present invention.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A rotor system comprising:
    a hub;
    a rim configured to rotate about the hub, the rim including an interior surface and an engagement surface;
    a plurality of rotor blades extending from the hub and coupled to the interior surface of the rim; and
    one or more outer drive gears disposed adjacent to the engagement surface of the rim; each of the one or more outer drive gears comprising a plurality of teeth for engaging the engagement surface of the rim;
wherein the one or more outer drive gears is configured to rotate the rim such that the plurality of rotor blades rotates about the hub.

2. The system of claim 1, wherein each of the plurality of rotor blades has an inboard portion and an outboard portion, the inboard portion is configured to be coupled to the hub, and the outboard portion is configured to be coupled to the rim.

3. The system of claim 2, wherein the outboard portion of each of the plurality of rotor blades comprises a blade tip that collectively define a circumference, and the rim is configured to be coupled to each blade tip such that the rim extends about the circumference.

4. The system of claim 1, wherein each of the one or more outer drive gears can be rotated independently.

5. The system of claim 1, wherein the engagement surface is disposed on an exterior portion of the rim.

6. The system of claim 1, wherein the one or more outer drive gears can be rotated by at least one of an electric motor, a hydraulic motor, and a pneumatic motor.

7. The system of claim 1, wherein the hub is only rotated by the rim.

8. The system of claim 1, wherein the rim and the plurality of rotor blades comprise a unitary member.

9. An aircraft rotor system comprising:
a first hub having a first hub axis about which the first hub is configured to rotate;
a first plurality of rotor blades configured to extend from the first hub and rotate about the first hub axis;
wherein the first hub is configured to be rotated about the first hub axis only by the first plurality of rotor blades.

10. The system of claim 9, further comprising a first rim configured to extend about the first hub and comprising:
a first engagement surface; and
a first interior surface configured to be coupled to at least one rotor blade of the first plurality of rotor blades.

11. The system of claim 10, further comprising one or more outer drive gears disposed adjacent to the first engagement surface of the first rim comprising:
a plurality of teeth for engaging the first engagement surface of the first rim;
wherein the one or more outer drive gears are configured to rotate the first rim such that the first plurality of rotor blades rotates about the first hub.

12. The system of claim 11, wherein the one or more outer drive gears are disposed at equidistant points about the first engagement surface of the first rim.

13. The system of claim 11, wherein each of the one or more outer drive gears are configured to be rotated independently.

14. The system of claim 10, further comprising:
a second hub having a second hub axis about which the second hub is configured to rotate;
a second plurality of rotor blades configured to extend from the second hub and rotate about the second hub axis;
a second rim configured to extend about the second hub and comprising:
a second engagement surface; and
a second interior surface configured to be coupled to at least one rotor blade of the second plurality of rotor blades; and
an outer drive gear disposed adjacent to the first engagement surface of the first rim and the second engagement surface of the second rim, the outer drive gear comprising a plurality of teeth for engaging the first engagement surface of the first rim and the second engagement surface of the second rim;
wherein the outer drive gear is configured to rotate the first rim and the second rim.

15. The system of claim 14, wherein the first rim rotates in a first direction and the second rim rotates in a second direction such that the first direction and the second direction are different directions.

16. The system of claim 14, wherein the outer drive gear is at least one of the following: a spiral bevel gear, a bevel gear, and a face gear.

17. A method of operating an aircraft rotor system comprising:
providing a first rotor assembly, comprising:
a first hub;
a first rim configured to rotate about the first hub, the first rim including a first interior surface and a first engagement surface; and
a first plurality of rotor blades extending from the first hub and coupled to the first interior surface of the first rim;
providing a first drive gear disposed adjacent to the first engagement surface of the first rim; and
rotating the first drive gear to impart rotation to the first rotor assembly.

18. The method of claim 17, further comprising:
providing a second drive gear disposed adjacent to the first engagement surface of the first rim; and
rotating the second drive gear to impart rotation to the first rotor assembly.

19. The method of claim 17, further comprising:
providing a second rotor assembly, comprising:
a second hub;
a second rim configured to rotate about the second hub, the second rim including a second interior surface and a second engagement surface; and
a second plurality of rotor blades extending from the second hub and coupled to the second interior surface of the second rim;
wherein the step of rotating the first drive gear imparts rotation to the second rotor assembly.

20. The method of claim 19, wherein the first plurality of rotor blades and the second plurality of rotor blades rotate in different directions.

* * * * *